United States Patent
Kim et al.

(10) Patent No.: US 9,711,968 B2
(45) Date of Patent: Jul. 18, 2017

(54) WIRELESS POWER TRANSMISSION APPARATUS AND WIRELESS POWER TRANSMISSION METHOD

(75) Inventors: Nam Yun Kim, Seoul (KR); Young Tack Hong, Seongnam-si (KR); Sang Wook Kwon, Seongnam-si (KR); Eun Seok Park, Suwon-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 892 days.

(21) Appl. No.: 13/078,130

(22) Filed: Apr. 1, 2011

(65) Prior Publication Data
US 2011/0241438 A1    Oct. 6, 2011

(30) Foreign Application Priority Data

Apr. 1, 2010  (KR) .................. 10-2010-0029893

(51) Int. Cl.
| | | |
|---|---|---|
| H02J 17/00 | (2006.01) |
| H02J 5/00 | (2016.01) |
| H04B 5/00 | (2006.01) |
| H02J 7/02 | (2016.01) |

(52) U.S. Cl.
CPC .............. *H02J 5/005* (2013.01); *H02J 7/025* (2013.01); *H04B 5/0075* (2013.01); *H04B 5/0081* (2013.01)

(58) Field of Classification Search
CPC .............................. H02J 17/00; H04B 5/0037
See application file for complete search history.

(56) References Cited

U.S. PATENT DOCUMENTS

| | | | | |
|---|---|---|---|---|
| 5,425,704 | A  * | 6/1995 | Sakurai et al. ................. 604/22 |
| 7,010,284 | B2 * | 3/2006 | Liu et al. .................... 455/253.2 |
| 8,334,619 | B2 * | 12/2012 | Takei .................. H04B 5/0012 |
| | | | | 307/104 |
| 2003/0076168 | A1* | 4/2003 | Forrester ....................... 330/129 |
| 2004/0212434 | A1* | 10/2004 | Nagamori et al. ............ 330/285 |
| 2007/0109708 | A1* | 5/2007 | Hussman et al. ............. 361/113 |
| 2009/0284245 | A1 | 11/2009 | Kirby et al. |
| 2010/0052431 | A1* | 3/2010 | Mita ............................. 307/104 |

FOREIGN PATENT DOCUMENTS

| | | |
|---|---|---|
| JP | 2003-284264 A | 10/2003 |
| JP | 2006-286254 A | 10/2006 |
| JP | 2008-061208 | 3/2008 |

(Continued)

OTHER PUBLICATIONS

Korean Office Action issued on Apr. 27, 2016 in counterpart Korean Application No. 10-2010-0029893 (13 pages in Korean with English translation).

*Primary Examiner* — Jared Fureman
*Assistant Examiner* — Joel Barnett
(74) *Attorney, Agent, or Firm* — NSIP Law

(57) ABSTRACT

Provided is a wireless power transmission apparatus and method. The wireless power transmission apparatus may include a coupling unit to couple a reflected signal with respect to a transmitted resonance power, and a resonance point detecting unit to scan a frequency of the reflected signal to detect a resonance point. A resonance frequency of the source resonator may be controlled using the detected resonance point.

12 Claims, 18 Drawing Sheets

(56) References Cited

FOREIGN PATENT DOCUMENTS

| | | |
|---|---|---|
| JP | 2008-278038 | 11/2008 |
| JP | 2009-261105 | 11/2009 |
| JP | 2009-261156 | 11/2009 |
| KR | 10-2007-0105342 | 10/2007 |
| KR | 10-2008-0012342 | 2/2008 |
| KR | 10-2009-0118094 | 11/2009 |

* cited by examiner

WIRELESS POWER TRANSMISSION APPARATUS AND WIRELESS POWER TRANSMISSION METHOD

CROSS-REFERENCE TO RELATED APPLICATION(S)

This application claims the benefit under 35 U.S.C. §119 (a) of Korean Patent Application No. 10-2010-0029893, filed on Apr. 1, 2010, in the Korean Intellectual Property Office, the entire disclosure of which is incorporated herein by reference for all purposes.

BACKGROUND

1. Field

The following description relates to a wireless power transmission apparatus and wireless power transmission method.

2. Description of Related Art

With the development of Information Technology (IT), a variety of portable electronic devices and the distribution of the portable electronic devices have increased. Due to characteristics of the portable electronic devices, battery performance of a corresponding portable electronic device has become a critical issue. In addition to the portable electronic devices, home electronic appliances may wirelessly transmit data and may be supplied with power over a power line.

Currently, researches have been conducted on wireless power transmission technology that may wirelessly supply power to portable electronic devices and/or home electronic appliance. Due to characteristics of a wireless power transmission environment, a distance between a source resonator and a target resonator may change over time, and a matching condition of the source resonator and the target resonator may also change.

Accordingly, there is a desire for a method to improve wireless power transmission efficiency even if the distance between the source resonator and the target resonator varies over time and/or if requirements to match the source resonator and the target resonator change.

SUMMARY

In one general aspect, there is provided a wireless power transmission apparatus including a source resonator to transmit resonance power to a target resonator, a coupling unit to couple a reflected signal with respect to the transmitted resonance power, a resonance point detecting unit to scan a frequency of the reflected signal to detect a resonance point, and an impedance control unit to adjust an impedance of the source resonator based on the detected resonance point.

The resonance point detecting unit may comprise a level adjusting unit to adjust a signal level of the reflected signal, a power level detecting unit to detect a power level of the adjusted reflected signal, and a frequency scanning unit to perform frequency scanning with respect to the detected power level.

The resonance point detecting unit may further comprise a frequency synthesizer to output a frequency signal indicating a shifted level of a frequency of an alternating current (AC) signal that shifted due to an effect of the reflected signal, wherein the AC signal is converted by an AC converter.

The resonance point may correspond to a coupling frequency between the source resonator and the target resonator.

The impedance control unit may set an impedance set value for a maximal power transmission to be 33 ohms to 55 ohms, and adjusts the impedance of the source resonator to satisfy the impedance set value for the maximal power transmission.

The impedance control unit may adjust the impedance of the source resonator to achieve a wireless power transmission efficiency that is above a threshold value.

In another aspect, there is provided a wireless power transmission method including performing frequency scanning with respect to a reflected signal of a transmitted resonance power, detecting a resonance point using a performance result of the frequency scanning, and adjusting an impedance of a source resonator based on the detected resonance point.

The detecting may comprise adjusting a signal level of the reflected signal, converting the adjusted reflected signal level into a direct current (DC) signal, and performing frequency scanning with respect to the reflected signal having the adjusted signal level.

The detecting may comprise synthesizing the frequency of an alternating current (AC) signal converted by an AC converter and a frequency of the reflected signal to output a frequency signal indicating a shifted level of a frequency of the AC signal that shifted due to an effect of the reflected signal, and converting the frequency signal into a DC signal.

The resonance point may correspond to a coupling frequency between the source resonator and the target resonator.

The adjusting may comprise calculating a frequency deviation between the detected resonance point and a resonance frequency, and calculating an impedance deviation corresponding to the frequency deviation, and adjusting the impedance of the source resonator to be 33 ohms to 55 ohms based on the impedance deviation.

The impedance may be adjusted to achieve a wireless power transmission efficiency that is above a threshold value.

In another aspect, there is provided a wireless power receiving device including a target resonator configured to receive power wirelessly from a source resonator, and a load configured to consume the wireless power received from the source resonator, wherein the wireless power receiving device reflects a portion of the wireless power received from the source resonator, and the target resonator is further configured to receive wireless power from the source resonator that has a change in impedance based on the reflected portion of the wireless power.

The wireless power receiving device may further comprise a rectifier to rectify the power signal received from the source resonator.

Other features and aspects will be apparent from the following detailed description, the drawings, and the claims.

Figure 1:
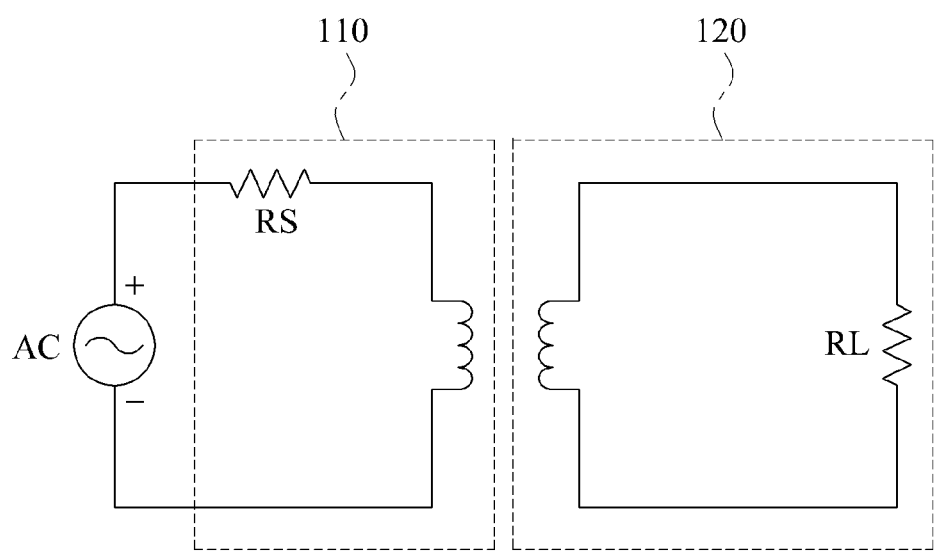
FIG. 1 is a diagram illustrating an example of a wireless power transmission using a resonator.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an example of a wireless power transmission using a resonator.

Wireless power transmission using the resonator may use a resonance characteristic between a source resonator 110 and a target resonator 120. For example, the source resonator 110 may be configured in a helix coil structured resonator, a spiral coil structured resonator, a meta-structured resonator, and the like.

Referring to FIG. 1, the source resonator 110 and the target resonator 120 may have the same resonance frequency. A maximal efficiency of the wireless power transmission may be the obtained when impedance states are the same. For example, when a value of RS and a value of RL are the same, a maximal power may be transmitted from the source resonator 110 and to the target resonator 120. As described above, the impedance between a resonance power transmission apparatus and a resonance power reception apparatus may be considered during power transmission.

The impedance between the source resonator and the target resonator may change due to various factors, for example, a change in distance between the source resonator 110 and the target resonator 120, a change in location of one of the source resonator 110 and the target resonator 120, and the like. As another example, a reflected impedance that occurs in the source resonator 110 or the target resonator 120 may cause the impedance between the source resonator 110 and the target resonator 120 to vary. The variation in the impedance between the source resonator 110 and the target resonator 120 may be a direct cause of a resonance mismatch.

Accordingly, a scheme for monitoring the occurrence of resonance mismatch in real time may improve wireless power transmission. For example, the scheme may search for an accurate resonance point when the resonance mismatch occurs.

Figure 2:
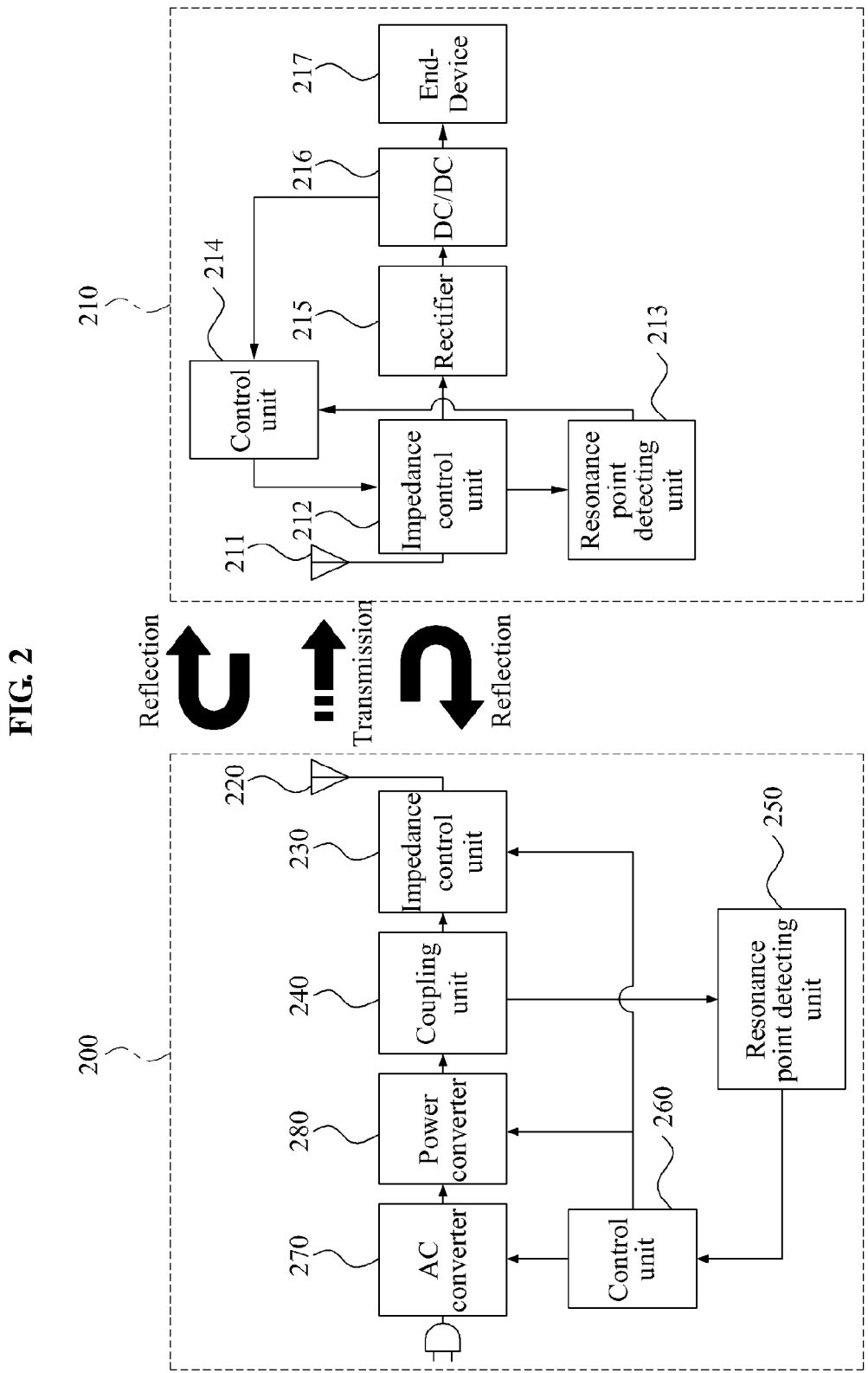
FIG. 2 is a diagram illustrating an example of a wireless power transmission and reception system.

FIG. 2 illustrates an example of a wireless power transmission and reception system.

Referring to FIG. 2, the wireless power transmission and reception system includes a wireless power transmission apparatus 200 and a target apparatus 210. In this example, the wireless power transmission apparatus 200 includes a source resonator 220, an impedance control unit 230, a coupling unit 240, a resonance point detecting unit 250, and a control unit 260. The wireless power transmission apparatus 200 may further include an alternating current (AC) converter 270 and a power converter 280.

The target apparatus 210 may be an apparatus that receives the resonance power and consumes the power and/or retransmits the power to a load. In this example, the target apparatus 210 includes a target resonator 211 to receive the resonance power, an impedance control unit 212, a resonance point detecting unit 213, a control unit 214, a rectifier 215, a direct current (DC)-DC converter 216, and an end-device 217. In certain aspects, the end-device 217 may be separated from the target apparatus 210.

The impedance control unit 230 may be activated by the control unit 260. The impedance control unit 230 may receive an input of an impedance deviation from the control unit 260, and may adjust an impedance of the source resonator 220 based on the impedance deviation. For example, the impedance control unit 230 may adjust the impedance of the source resonator 220 based on a detected resonance point.

As described herein, the impedance deviation may refer to a level of the mismatched impedance. An impedance mismatch may refer to a state in which a reflected wave occurs because the impedance between the source resonator 220 and the target resonator 211 is not matched. As a result, power transmitted from the source resonator 220 to the target resonator 211 may not be received by the target resonator 211 but may instead be reflected.

As an example, the impedance control unit 230 may adjust the impedance of the source resonator 220 to be approximately 33 ohms to 55 ohms. The impedance control unit 230 may set an impedance set value for a maximal power transmission to be approximately 33 ohms to 55 ohms, and may adjust the impedance of the source resonator 220 to satisfy the impedance set value for the maximal power transmission. As another example, the impedance control unit 230 may adjust the impedance of the source resonator 220 to satisfy a threshold value for power transmission which is below the maximum power transmission value.

As an example, the wireless power transmission apparatus 200 may receive a reflected wave signal from the target apparatus 210. In this example, the reflected wave is in response to power being wirelessly transmitted from the wireless power transmission apparatus 200 to the target apparatus. Accordingly, the control unit 260 may determine if an impedance mismatch has occurred.

In response to impedance mismatch occurring, the impedance of the wireless power transmission apparatus 200 may be adjusted to reduce the reflected wave and to increase wireless power transmission efficiency. For example, the impedance may be adjusted such that the reflected wave received from the target apparatus 210 is below a threshold value. As another example, the impedance may be adjusted until no reflected wave is received from the target apparatus 210.

The coupling unit 240 may couple a reflected signal with respect to a transmitted resonance power. The coupling unit 240 may couple the reflected signal corresponding to a power transmitted to the target apparatus 210. The coupling unit 240 may include a rectifier (not shown) to generate a direct current by rectifying the reflected wave. For example, the rectifier may include at least one of a diode, a resistor, a condenser, and a coil. The rectifier may include a smoothing circuit. A high frequency signal may be converted into a DC signal by the smoothing circuit. In certain aspects, the direct current generated through the rectifier may be provided to the control unit 260 to be used as an auxiliary power of the wireless power transmission apparatus 200.

The resonance point detecting unit 250 may detect the resonance point by scanning a frequency of the reflected signal. In this example, the resonance point may correspond to a coupling frequency between the source resonator 220 and the target resonator 211. The coupling frequency may refer to a frequency used when the source resonator 220 and the target resonator 211 are coupled and the resonance power is transmitted and is received.

The control unit 260 may determine whether an impedance mismatch occurs using the detected resonance point, and the control unit 260 may activate the impedance control unit 230 when the control unit 260 determines that the impedance mismatch has occurred. For example, the control unit 260 may calculate a frequency deviation between a resonance frequency and the resonance point based on a center of the coupling frequency, and may calculate an impedance deviation corresponding to the frequency deviation. The control unit 260 may receive an input of a transmission power of the wireless power transmission apparatus 200, and may control the AC converter 270 to adjust a power level for power transmission.

For example, the control unit 260 may control an operation period of the coupling unit 240 and the resonance point detecting unit 250 to monitor the occurrence of the impedance mismatch. For example, the control unit 260 may provide an operation clock signal or an operation command signal to the coupling unit 240 and the resonance point detecting unit 250.

The AC converter 270 may receive an input of the AC signal, and may convert a frequency of the inputted AC signal. The frequency of the converted AC signal may become the resonance frequency. For example, the AC converter 270 may convert the frequency of the inputted AC signal to approximately 4 MHz to 14 MHz. The AC converter 270 may adjust a level of the inputted AC signal based on a control of the control unit 260.

The power converter 280 may generate power in the AC signal having a converted frequency. For example, the power converter 280 may generate power in the AC signal that has the frequency of approximately 4 MHz to 14 MHz. The power generated in the power converter 280 may be provided to the source resonator 220 through the coupling unit 240 and the impedance control unit 230. In certain aspects, the power generated in the power converter 280 may be provided to the source resonator 220 without using the coupling unit 240 and the impedance control unit 230.

In the example illustrated in FIG. 2, the wireless power transmission apparatus 200 may perform a frequency scanning with respect to the reflected signal of the transmitted resonance power, may detect the resonance point using a performance result of the frequency scanning, and may adjust the impedance of the source resonator 220 based on the detected resonance point. For example, the wireless power transmission apparatus may scan the frequency of the reflected wave to determine an increased and/or an optimal wireless transmission power.

The impedance control unit 212 may perform the same function as a function of the impedance control unit 230 of the wireless power transmission apparatus 200. The resonance point detecting unit 213 may perform the same function as a function of the resonance point detecting unit 250. The control unit 214 may perform a similar function as a function of the control unit 260.

The rectifier 215 may rectify a received signal to convert the received signal into a DC signal.

The DC-DC converter 216 may adjust a level of the DC signal to provide a desired power to the end-device 217.

The end-device 217 may be a load to consume the power, for example, and may refer to a battery or various devices.

Figure 3:
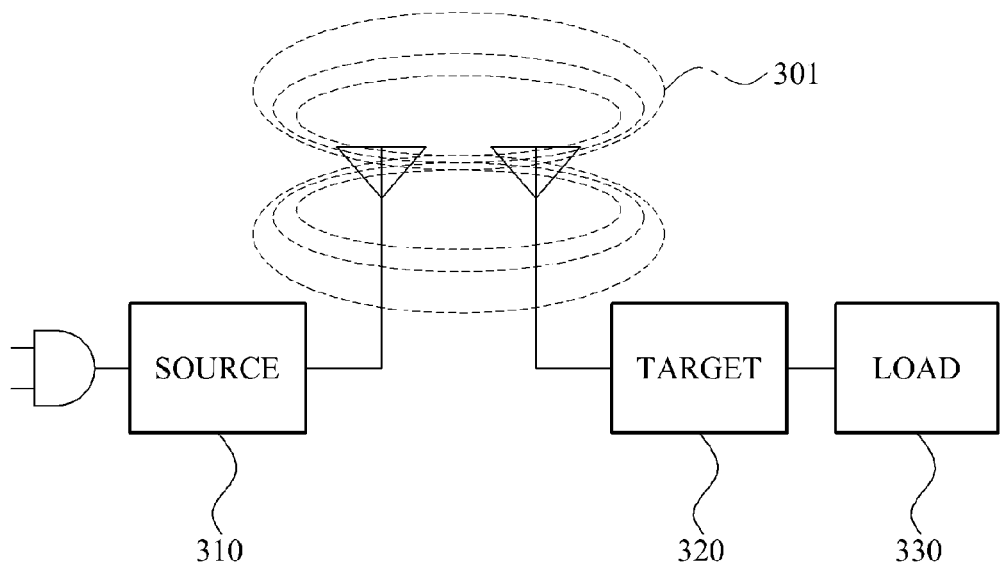
FIG. 3 and FIG. 4 are diagrams illustrating example operations of a wireless power transmission and reception system.
Figure 4:
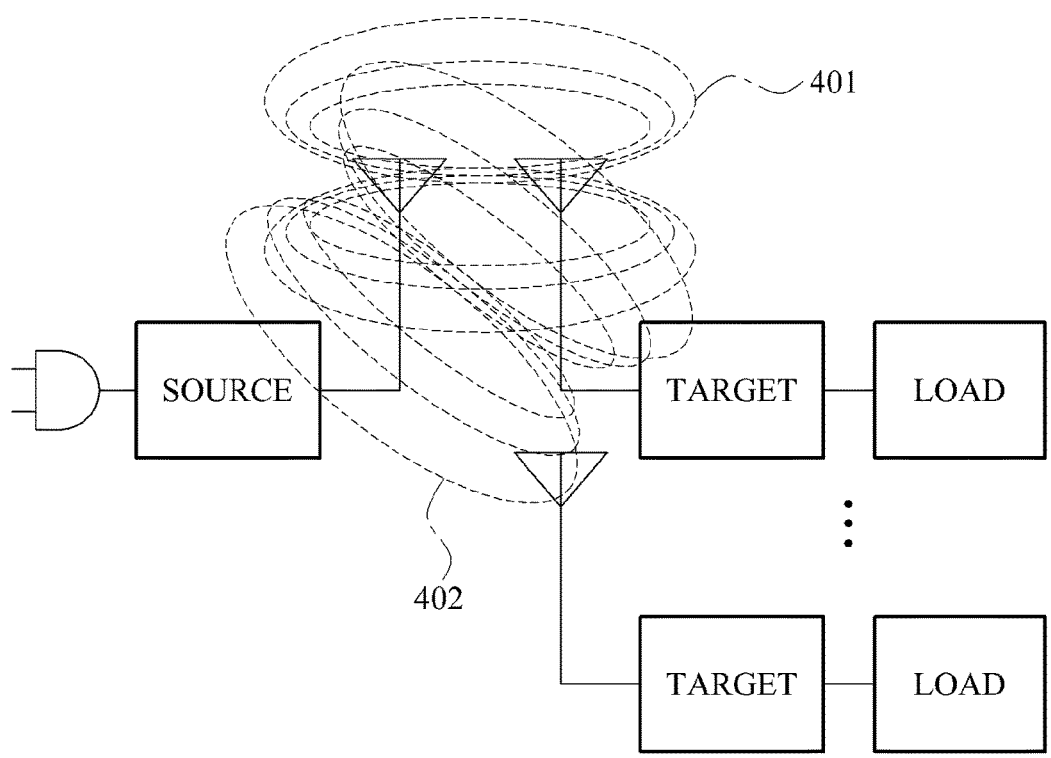

FIG. 3 and FIG. 4 illustrate example operations of a wireless power transmission and reception system.

Figure 5:
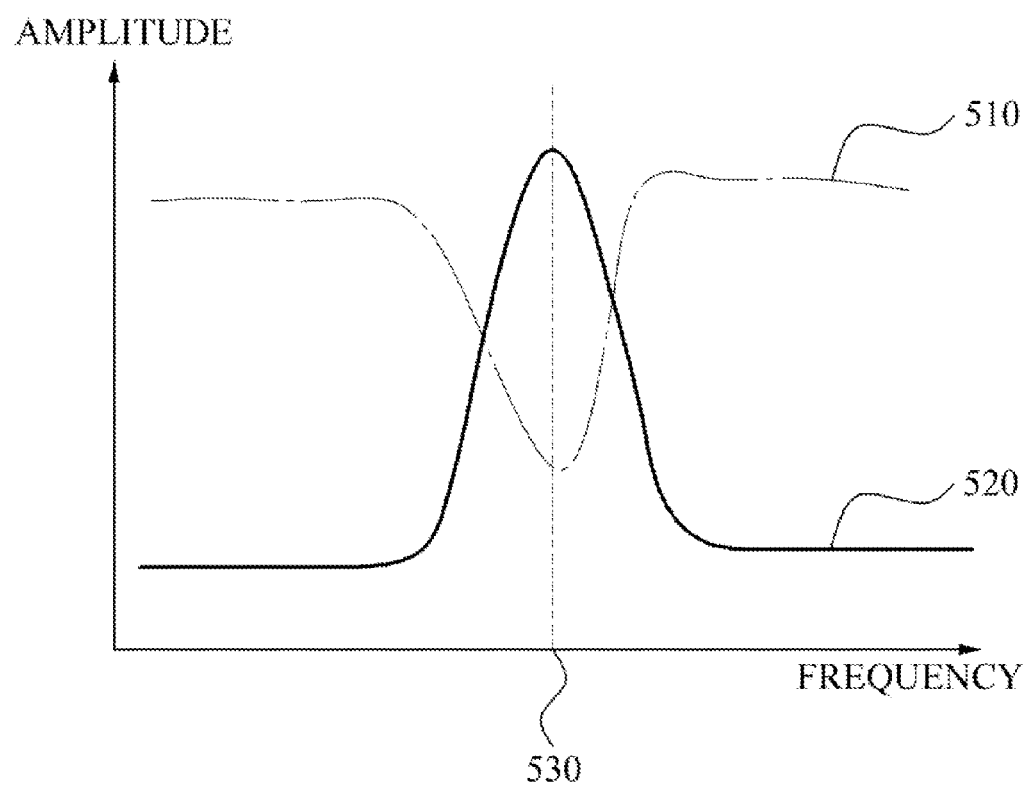
FIG. 5 is a diagram illustrating an example of power point detection of a wireless power transmission apparatus.

FIG. 5 illustrates an example of power point detection of a wireless power transmission apparatus.

Referring to FIG. 3, a source 310 to transmit a resonance power and a target 320 to receive the resonance power may operate in a one to one relationship. In the example of FIG. 3, the target 320 may be connected to a load 330 to consume a power.

Referring to FIG. 4, a source and a target may form a 1 to N relationship. For example, resonance power may be transmitted to a plurality of target apparatuses. In the examples of FIG. 3 and FIG. 4, a magnetic field may form as illustrated by the dotted lines, and an inductance coupling 301, 401, and 402 may occur due to the formation of the magnetic field. In this example, the inductance coupling generated due to the formation of the magnetic field may refer to a mutual inductance.

Referring to FIG. 5, a waveform 520 measured in a target resonator 211 may have a maximal amplitude at a frequency 530 in which a reflected signal 510 has a minimal amplitude. For example, an optimum resonance point may be found using a measurement result of the reflected signal 510. In this example, each of the reflected signal 510 and the waveform 520 measured in the target resonator 211 may be obtained through frequency scanning.

Figure 6:
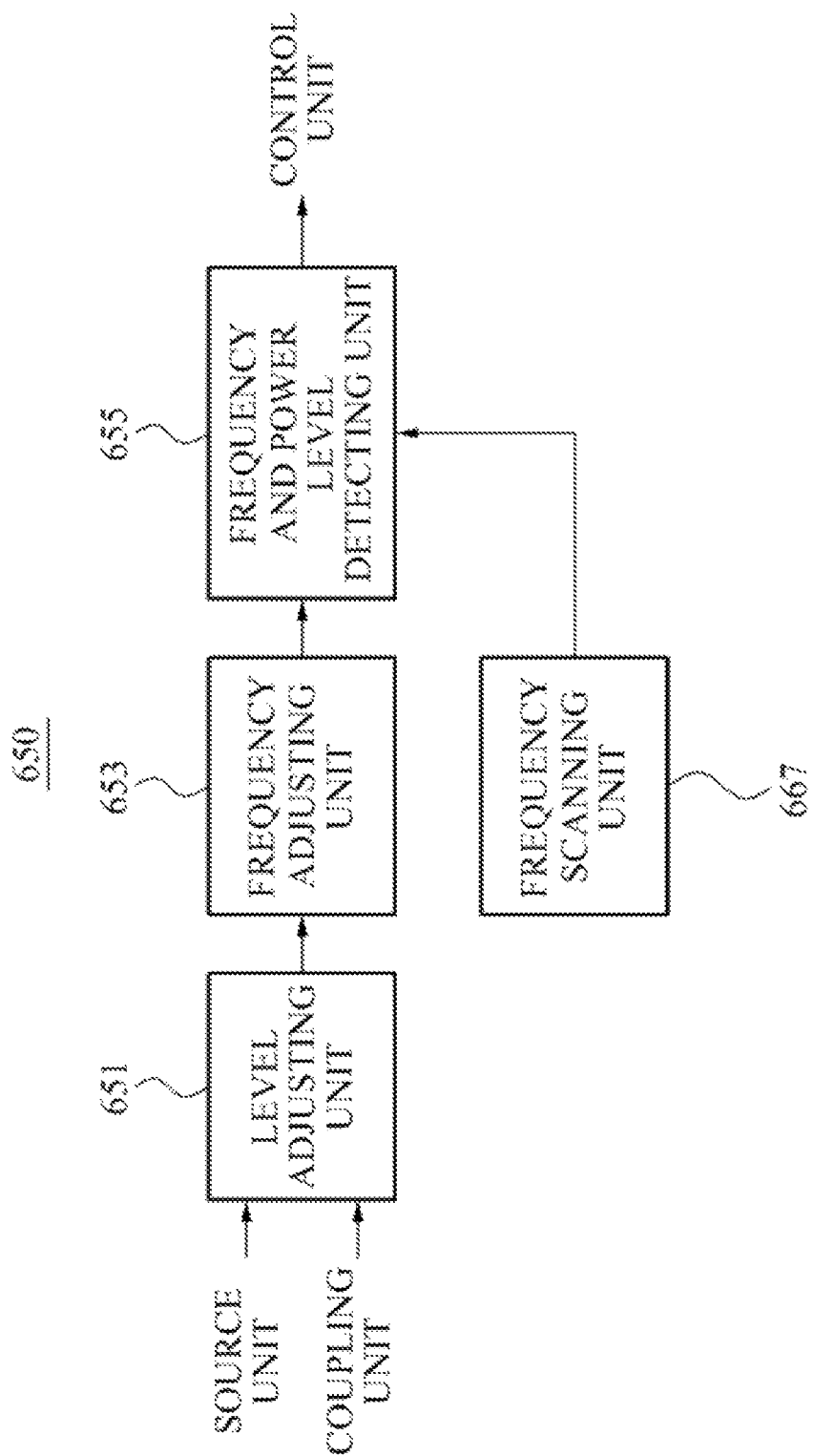
FIG. 6 is a diagram illustrating an example of a resonance point detecting unit.

FIG. 6 illustrates an example of a resonance point detecting unit. For example, the resonance point detecting unit may be included in the wireless power transmission apparatus 200 and/or the target apparatus 210 shown in FIG. 2.

Referring to FIG. 6, resonance point detecting unit 650 includes a level adjusting unit 651, a frequency and power level detecting unit 655, and a frequency scanning unit 667. The resonance point detecting unit 250 may further include a frequency adjusting unit 653.

The level adjusting unit 651 may adjust a signal level of a reflected signal. For example, the level adjusting unit 651 may adjust a power level of the reflected signal to a power level that an analog to digital converter (ADC) may process. Referring to FIG. 2, if power transmitted from a source resonator 220 is 100%, anywhere from 0% to 100% of the power may be reflected by the target resonator. The reflected power may be a result of an impedance difference between the target apparatus 210 and the wireless power transmission apparatus 200. The reflected power corresponds to power due to the reflected signal. The level adjusting unit 651 may receive information related to an electric energy provided from a power converter 280 to the source resonator 220. The information may be received in the form of a reference signal. The reference signal may be used to compare a difference in electric energy between the transmitted power and the reflected power, and a difference between the detected resonance point and a currently used resonance frequency.

The frequency and power level detecting unit 655 may adjust the signal level of the reflected signal to measure a detecting range, and may detect the power level of the reflected signal having the adjusted level. The frequency and power level detecting unit 655 may form a waveform of a reflected signal 510 as illustrated in the example of FIG. 5.

Figure 8:
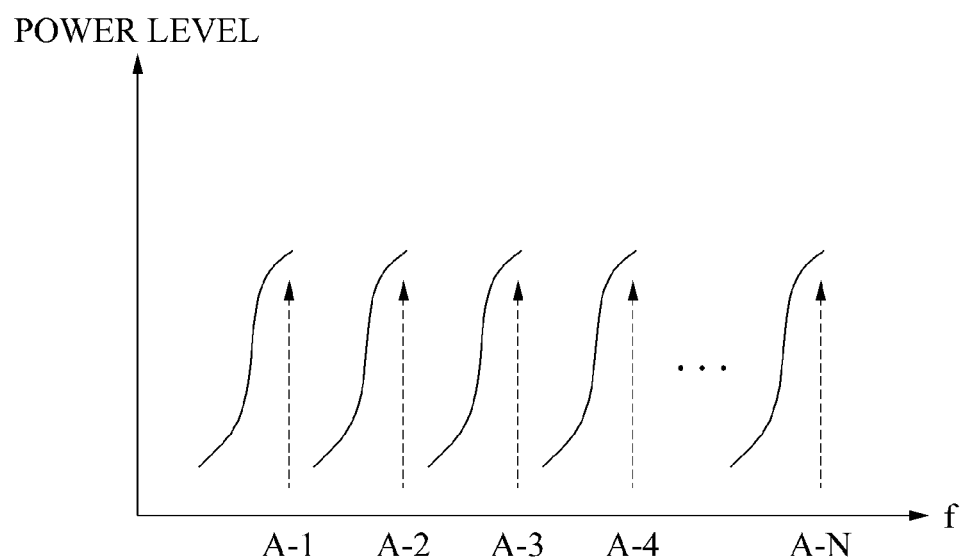
FIG. 8 is a diagram illustrating an example of a frequency scanning scheme.

The frequency scanning unit 667 may perform frequency scanning with respect to the detected power level. For example, the detected power level may refer to the waveform of the reflected signal 510 illustrated in FIG. 5. As described in FIG. 8, the frequency scanning unit 667 may search for a coupling frequency by sequentially scanning the amplitude of the reflected signal 510. For example, the frequency scanning unit 667 may scan at frequencies A-1, A-2, A-3, A-4, and A-N as illustrated in FIG. 8.

In response to an available resonance frequency varying for each application or system, the frequency adjusting unit 653 may perform a function of changing the resonance frequency into a frequency that may be processed. As an example, if the resonance frequency that is equal to or less than 30 MHz is used in the wireless power transmission apparatus 200, the frequency adjusting unit 653 may change the resonance frequency into a frequency equal to or greater than 30 MHz. When the frequency and power level detecting unit 655 is enabled to detect the frequency equal to or greater than 30 MHz, the frequency adjusting unit 653 may perform a function of multiplying the frequency that is equal to or less than 30 MHz so that the frequency may be equal to or greater than 30 MHz, and the like.

Figure 7:
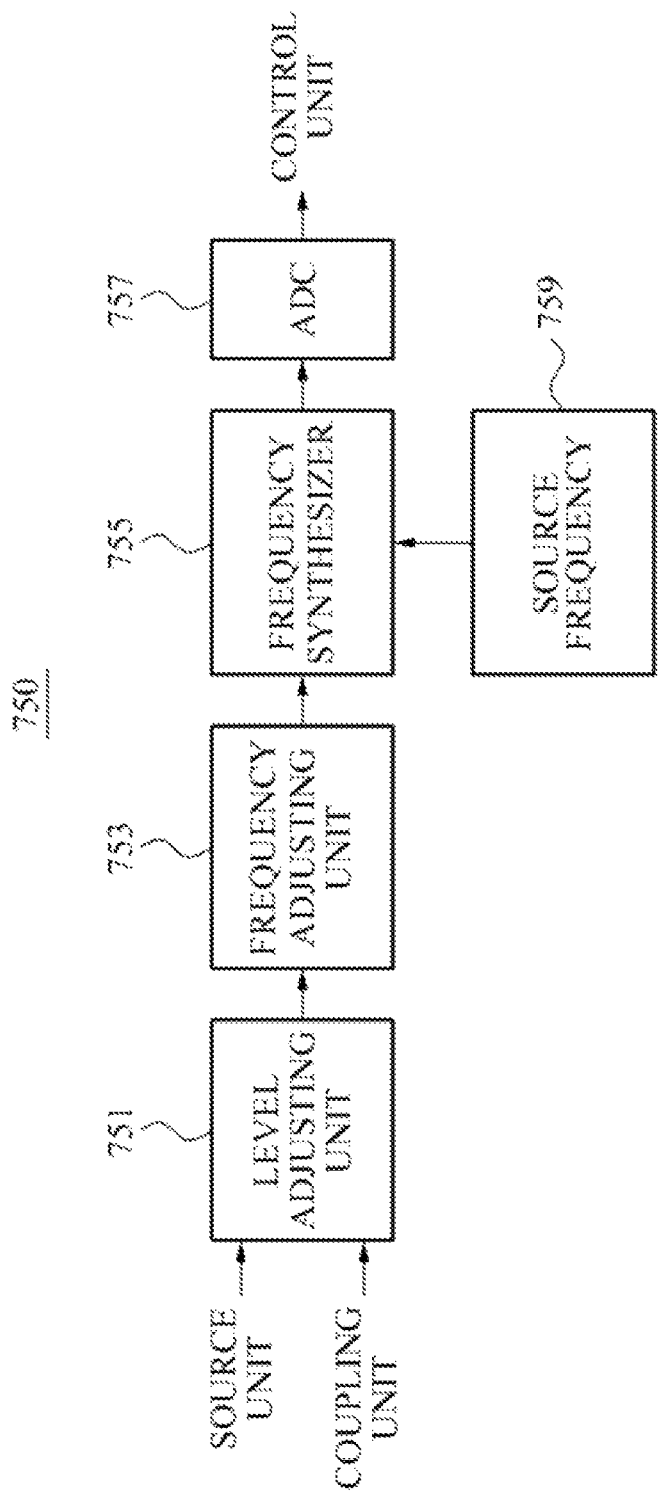
FIG. 7 is a diagram illustrating another example of a resonance point detecting unit.

FIG. 7 illustrates another example of a resonance point detecting unit.

In the example illustrated in FIG. 7, resonance point detecting unit 750 includes a level adjusting unit 751 and a frequency adjusting unit 753 which may perform the same function as a function of a level adjusting unit 651 and a frequency adjusting unit 653 described with reference to FIG. 6.

In this example, the resonance point detecting unit 750 includes a frequency synthesizer 755. The frequency synthesizer 755 may synthesize a source frequency 759 and a frequency of an AC signal converted by an AC converter such as the AC converter 270 shown in FIG. 2. In this example, the source frequency 759 may refer to a frequency equal to a frequency of a reflected wave. Thus, the frequency synthesizer 755 may output a frequency signal indicating a shifted level of a frequency of an AC signal that has shifted because of an effect of the reflected signal. Because the frequency signal outputted from the frequency synthesizer 755 may have a band of several kHz, a high-speed ADC may not be used for resonance point detection.

An analog-to-digital converter (ADC) 757 may generate a reflected wave illustrated in FIG. 5 by converting an inputted signal into a DC signal. The ADC 757 may receive an input of the frequency signal that has a band of several kHz. Thus, the ADC 757 may easily detect a shifted level of the frequency without requiring a high-speed performance.

Figure 9:
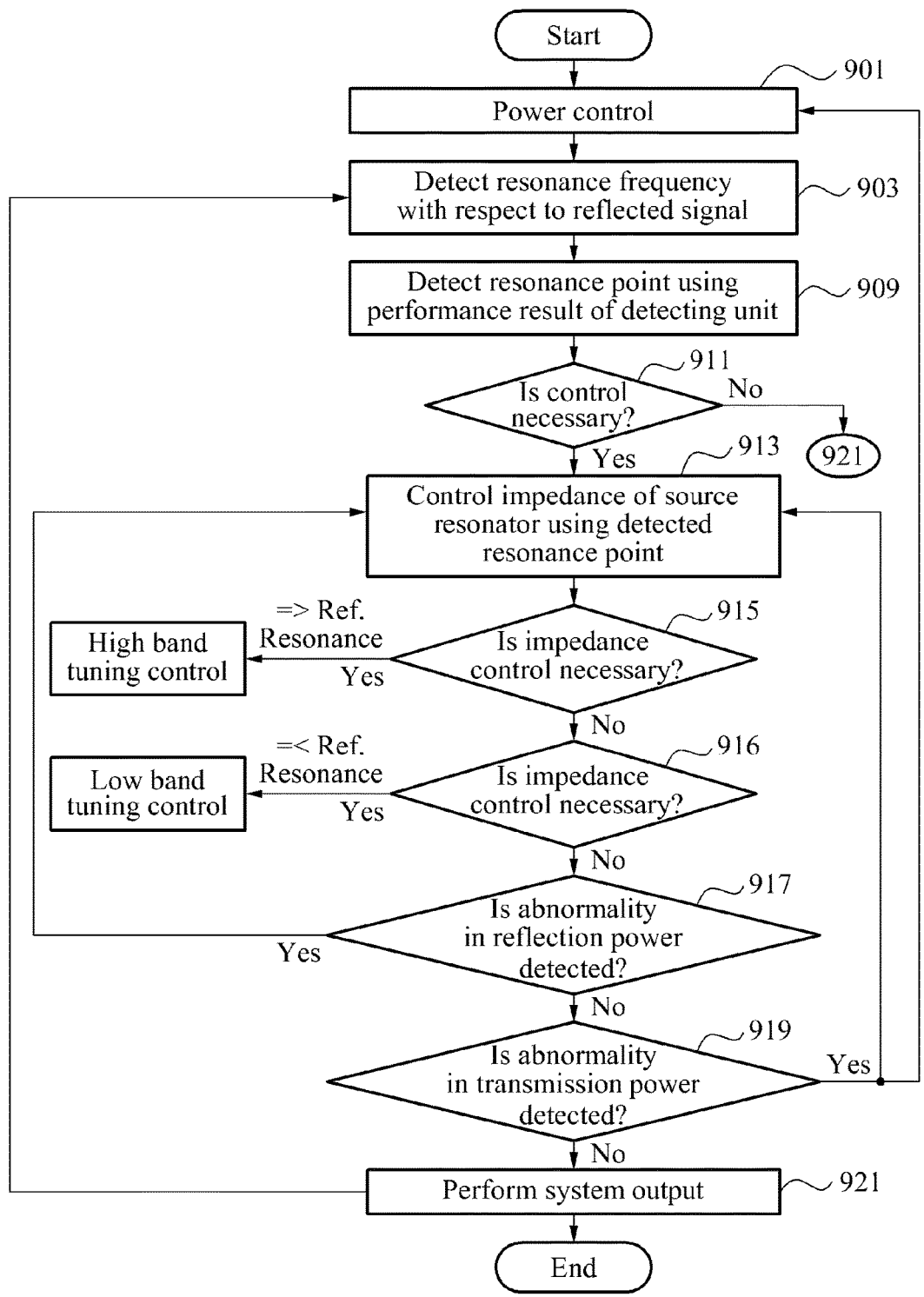
FIG. 9 is a diagram illustrating an example of a wireless power transmission method.

FIG. 9 illustrates an example of a wireless power transmission method.

The example described in FIG. 9 may be performed by a wireless power transmission apparatus 200 illustrated in FIG. 2. In the example described in FIG. 9, 903 through 913 may also be performed by the target apparatus 210 illustrated in FIG. 2.

In 901, the wireless power transmission apparatus performs power control. For example, the power control may be performed by an AC converter, a power converter, and a control unit.

In 903, the wireless power transmission apparatus detects a resonance frequency with respect to a reflected signal. For example, the reflected signal may refer to a reflected wave generated by an impedance mismatch. The resonance frequency with respect to the reflected signal may refer to a resonance point.

In 909, the wireless power transmission apparatus detects the resonance point using a resonance point detecting unit.

In 911, the wireless power transmission apparatus determines whether to control impedance. The wireless power transmission apparatus may determine to control impedance in response to the detected resonance point being different from the resonance frequency.

In 913, the wireless power transmission apparatus controls the impedance of a source resonator using the detected resonance point.

An example of controlling impedance is illustrated in 915 through 917.

In 915 and 916 the wireless power transmission apparatus determines whether to control impedance For example, the wireless power transmission apparatus may convert a difference between the detected resonance point and the resonance frequency into an impedance deviation, and based on the deviation the wireless power transmission apparatus may determine to control impedance. For example, if the impedance deviation deviates from 50 ohms by 5 ohms or more, or deviates from 33 ohms by 5 ohms or more, the wireless power transmission apparatus may determine that the impedance should be controlled. The wireless power transmission apparatus may adjust the impedance of the source resonator. The impedance adjustment of the source resonator may be performed in a high band or a low band based on a center of a coupling frequency.

In 917, the wireless power transmission apparatus determines whether a reflected power is detected. When an impedance matching between the source resonator and a target resonator is normally performed, the reflected power may not be detected due to the absence of the reflected wave. When the reflected power is not detected, the wireless power transmission apparatus may perform 919. As another example, if the reflected wave power is below a threshold amount, the wireless transmission apparatus may perform 919.

In 919, the wireless power transmission apparatus determines whether an abnormality in a transmission power is detected. For example, if a level of the transmission power decreases or increases, it may be determined that an abnormality in the transmission power exists. When it is determined that the abnormality in the transmission power exists, the wireless power transmission apparatus may repeatedly perform the power control of 901.

In 921, the wireless power transmission apparatus performs a system output, and may end a resonance power transmission or repeatedly perform 903.

For example, a source resonator and/or a target resonator may be configured as a helix coil structured resonator, a spiral coil structured resonator, a meta-structured resonator, and the like.

All materials may have a unique magnetic permeability (Mμ) and a unique permittivity epsilon (ϵ). The magnetic permeability indicates a ratio between a magnetic flux density that occurs with respect to a given magnetic field in a corresponding material and a magnetic flux density that occurs with respect to the given magnetic field in a vacuum state. The magnetic permeability and the permittivity may determine a propagation constant of a corresponding material at a given frequency or at a given wavelength. An electromagnetic characteristic of the corresponding material may be determined based on the magnetic permeability and the permittivity.

For example, a material having a magnetic permeability or a permittivity absent in nature and that is artificially designed may be referred to as a metamaterial. The metamaterial may be easily disposed in a resonance state even in a relatively large wavelength area or a relatively low frequency area. For example, even though a material size rarely varies, the metamaterial may be easily disposed in the resonance state.

Figure 10:
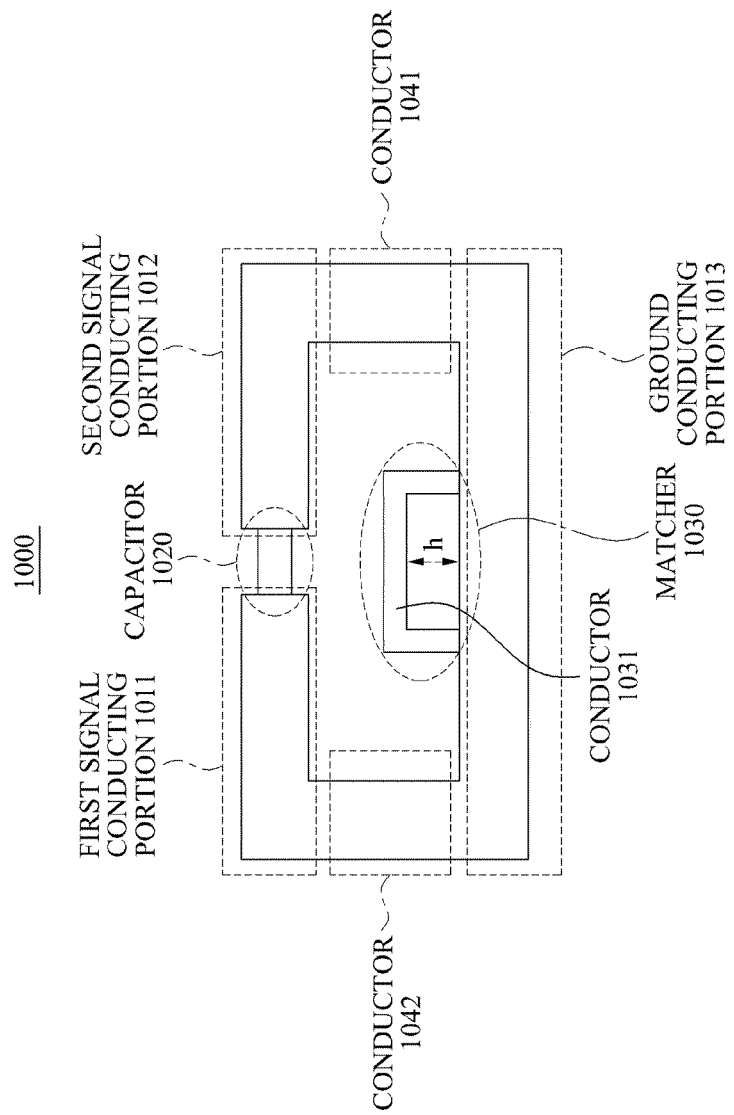
FIG. 10 through FIG. 16B are diagrams illustrating various examples of a resonator.

FIG. 10 illustrates a two-dimensional (2D) example of a resonator.

Referring to FIG. 10, resonator 1000 includes a transmission line, a capacitor 1020, a matcher 1030, and conductors 1041 and 1042. In this example, the transmission line includes a first signal conducting portion 1011, a second signal conducting portion 1012, and a ground conducting portion 1013.

The capacitor 1020 may be inserted in series between the first signal conducting portion 1011 and the second signal conducting portion 1012, and an electric field may be confined within the capacitor 1020. For example, the transmission line may include at least one conductor in an upper portion of the transmission line, and may also include at least one conductor in a lower portion of the transmission line. Current may flow through the at least one conductor disposed in the upper portion of the transmission line and the at least one conductor disposed in the lower portion of the transmission may be electrically grounded. In this example, a conductor disposed in an upper portion of the transmission line is referred to as the first signal conducting portion 1011 and the second signal conducting portion 1012. A conductor disposed in the lower portion of the transmission line is referred to as the ground conducting portion 1013.

In this example, the transmission line includes the first signal conducting portion 1011 and the second signal conducting portion 1012 in the upper portion of the transmission line, and includes the ground conducting portion 1013 in the lower portion of the transmission line. The first signal conducting portion 1011 and the second signal conducting portion 1012 may be disposed such that they face the ground conducting portion 1013. Current may flow through the first signal conducting portion 1011 and the second signal conducting portion 1012.

One end of the first signal conducting portion 1011 may be shorted to the conductor 1042, and another end of the first signal conducting portion 1011 may be connected to the capacitor 1020. One end of the second signal conducting portion 1012 may be grounded to the conductor 1041, and another end of the second signal conducting portion 1012 may be connected to the capacitor 1020. Accordingly, the first signal conducting portion 1011, the second signal conducting portion 1012, the ground conducting portion 1013, and the conductors 1041 and 1042 may be connected to each other, such that the resonator 1000 has an electrically closed-loop structure. The term "loop structure" may include a polygonal structure, for example, a circular structure, a rectangular structure, and the like. The loop structure indicates a circuit that is electrically closed.

The capacitor 1020 may be inserted into an intermediate portion of the transmission line. For example, the capacitor 1020 may be inserted into a space between the first signal conducting portion 1011 and the second signal conducting portion 1012. The capacitor 1020 may have various shapes, for example, a shape of a lumped element, a distributed element, and the like. For example, a distributed capacitor that has the shape of the distributed element may include zigzagged conductor lines and a dielectric material that has a relatively high permittivity between the zigzagged conductor lines.

When the capacitor 1020 is inserted into the transmission line, the resonator 1000 may have a property of a metamaterial. The metamaterial indicates a material that has a predetermined electrical property absent in nature, and thus, may have an artificially designed structure. An electromagnetic characteristic of materials that exist in nature may have a unique magnetic permeability or a unique permittivity. Most materials may have a positive magnetic permeability or a positive permittivity. In the case of most materials, a right hand rule may be applied to an electric field, a magnetic field, and a pointing vector and thus, the corresponding materials may be referred to as right handed materials (RHMs).

However, a metamaterial has a magnetic permeability or a permittivity absent in nature, and thus, may be classified into, for example, an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

When a capacitance of the capacitor inserted as the lumped element is appropriately determined, the resonator 1000 may have the characteristic of the metamaterial. Because the resonator 1000 may have a negative magnetic permeability by appropriately adjusting the capacitance of the capacitor 1020, the resonator 1000 may also be referred to as an MNG resonator. Various criteria may be applied to determine the capacitance of the capacitor 1020. For example, the various criteria may include a criterion for enabling the resonator 1000 to have the characteristic of the metamaterial, a criterion for enabling the resonator 1000 to have a negative magnetic permeability in a target frequency, a criterion for enabling the resonator 1000 to have a zeroth order resonance characteristic in the target frequency, and the like. The capacitance of the capacitor 1020 may be determined based on at least one criterion.

The resonator 1000, also referred to as the MNG resonator 1000, may have a zeroth order resonance characteristic that has, as a resonance frequency, a frequency when a propagation constant is "0". For example, a zeroth order resonance characteristic may be a frequency transmitted through a line or medium that has a propagation constant of "0". Because the resonator 1000 may have the zeroth order resonance characteristic, the resonance frequency may be independent with respect to a physical size of the MNG resonator 1000. By appropriately designing the capacitor 1020, the MNG resonator 1000 may sufficiently change the resonance frequency. Accordingly, the physical size of the MNG resonator 1000 may not be changed.

In a near field, the electric field may be concentrated on the capacitor 1020 inserted into the transmission line. Accordingly, due to the capacitor 1020, the magnetic field may become dominant in the near field. The MNG resonator 1000 may have a relatively high Q-factor using the capacitor 1020 of the lumped element and thus, it is possible to enhance an efficiency of power transmission. In this example, the Q-factor indicates a level of an ohmic loss or a ratio of a reactance with respect to a resistance in the wireless power transmission. It should be understood that the efficiency of the wireless power transmission may increase according to an increase in the Q-factor.

The MNG resonator 1000 may include the matcher 1030 for impedance matching. The matcher 1030 may adjust the strength of a magnetic field of the MNG resonator 1000. An impedance of the MNG resonator 1000 may be determined by the matcher 1030. For example, current may flow into and/or out of the MNG resonator 1000 via a connector. The connector may be connected to the ground conducting portion 1013 or the matcher 1030. Power may be transferred through coupling without using a physical connection between the connector and the ground conducting portion 1013 or the matcher 1030.

For example, as shown in FIG. 10, the matcher 1030 may be positioned within the loop formed by the loop structure of the resonator 1000. The matcher 1030 may adjust the impedance of the resonator 1000 by changing the physical shape of the matcher 1030. For example, the matcher 1030 may include the conductor 1031 for the impedance matching in a location that is separated from the ground conducting portion 1013 by a distance h. Accordingly, the impedance of the resonator 1000 may be changed by adjusting the distance h.

Although not illustrated in FIG. 10, a controller may be provided to control the matcher 1030. In this example, the matcher 1030 may change the physical shape of the matcher 1030 based on a control signal generated by the controller. For example, the distance h between the conductor 1031 of the matcher 1030 and the ground conducting portion 1013 may increase or decrease based on the control signal. Accordingly, the physical shape of the matcher 1030 may be changed and the impedance of the resonator 1000 may be adjusted. The controller may generate the control signal based on various factors, which is further described later.

As shown in FIG. 10, the matcher 1030 may be configured as a passive element such as the conductor 1031. As another example, the matcher 1030 may be configured as an active element such as a diode, a transistor, and the like. When the active element is included in the matcher 1030, the active element may be driven based on the control signal generated by the controller, and the impedance of the resonator 1000 may be adjusted based on the control signal. For example, a diode that is a type of active element may be included in the matcher 1030. The impedance of the resonator 1000 may be adjusted depending on whether the diode is in an ON state or in an OFF state.

Although not illustrated in FIG. 10, a magnetic core may pass through the MNG resonator 1000. The magnetic core may increase a power transmission distance.

Figure 11:
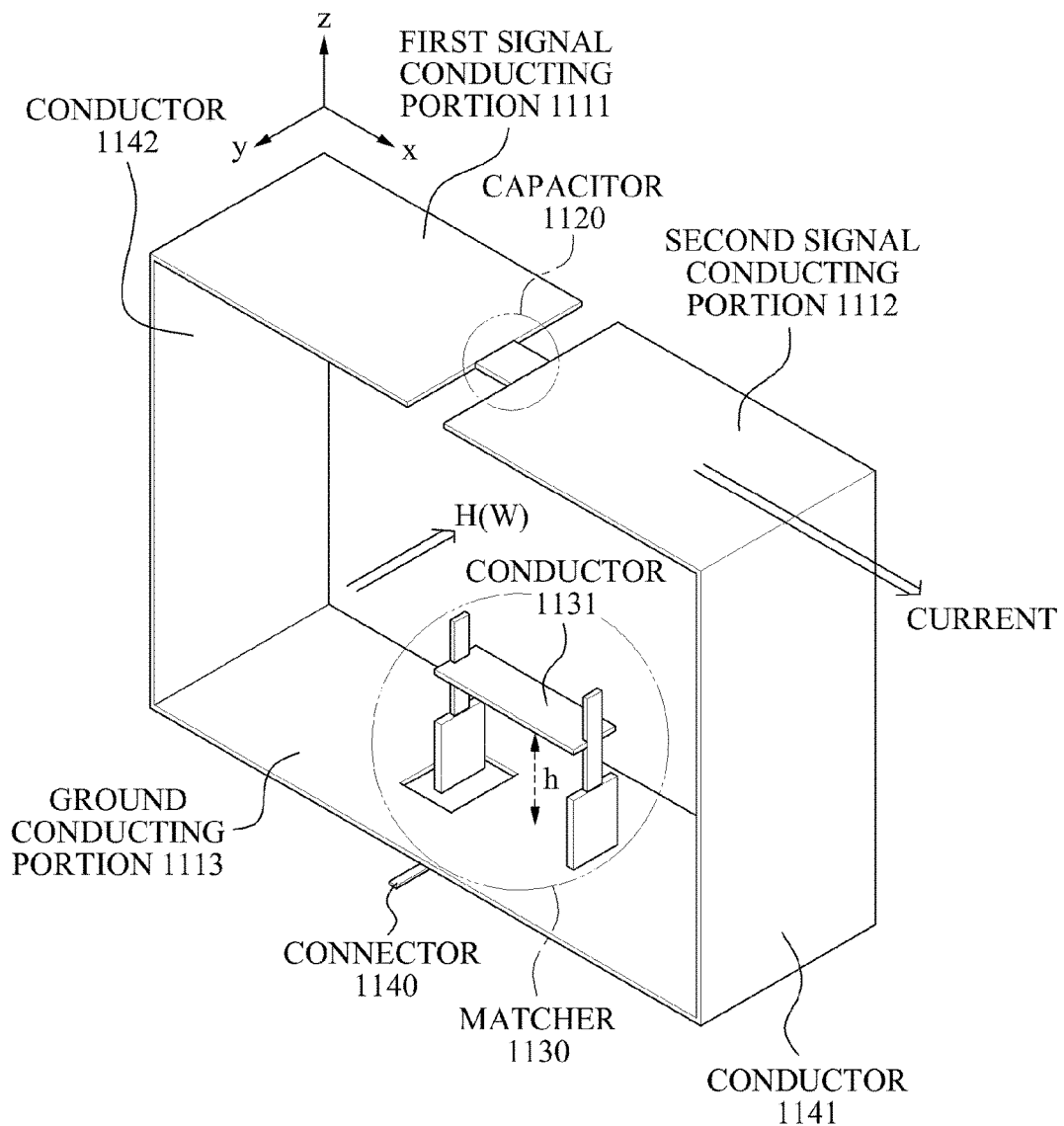

FIG. 11 illustrates a three-dimensional (3D) example of a resonator.

Referring to FIG. 11, resonator 1100 includes a transmission line and a capacitor 1120. In this example, the transmission line includes a first signal conducting portion 1111, a second signal conducting portion 1112, and a ground conducting portion 1113. The capacitor 1120 may be inserted in series between the first signal conducting portion 111 and the second signal conducting portion 1112 of the transmission line, and an electric field may be confined within the capacitor 1120.

In this example, the transmission line includes the first signal conducting portion 1111 and the second signal conducting portion 1112 in an upper portion of the resonator 1100, and includes the ground conducting portion 1113 in a lower portion of the resonator 1100. The first signal conducting portion 1111 and the second signal conducting portion 1112 may be disposed such that they face the ground conducting portion 1113. Current may flow in an x direction through the first signal conducting portion 1111 and the second signal conducting portion 1112. As a result of the current, a magnetic field H(W) may be formed in a −y direction. Alternatively, unlike the diagram of FIG. 11, the magnetic field H(W) may be formed in a +y direction.

One end of the first signal conducting portion 1111 may be shorted to the conductor 1142, and another end of the first signal conducting portion 1111 may be connected to the capacitor 1120. One end of the second signal conducting portion 1112 may be grounded to the conductor 1141, and another end of the second signal conducting portion 1112 may be connected to the capacitor 1120. Accordingly, the first signal conducting portion 1111, the second signal conducting portion 1112, the ground conducting portion 1113, and the conductors 1141 and 1142 may be connected to each other, such that the resonator 1100 has an electrically closed-loop structure, as described with reference to FIG. 10.

As shown in FIG. 11, the capacitor 1120 may be inserted between the first signal conducting portion 1111 and the second signal conducting portion 1112. For example, the capacitor 1120 may be inserted into a space between the first signal conducting portion 1111 and the second signal conducting portion 1112. The capacitor 1120 may have various shapes, for example, a shape of a lumped element, a distributed element, and the like. For example, a distributed capacitor that has the shape of the distributed element may include zigzagged conductor lines and a dielectric material that has a relatively high permittivity between the zigzagged conductor lines.

As the capacitor 1120 is inserted into the transmission line, the resonator 1100 may have a property of a metamaterial.

When a capacitance of the capacitor inserted as the lumped element is appropriately determined, the resonator 1100 may have the characteristic of the metamaterial. Because the resonator 1100 may have a negative magnetic permeability by adjusting the capacitance of the capacitor 1120, the resonator 1100 may also be referred to as an MNG resonator. Various criteria may be applied to determine the capacitance of the capacitor 1120. For example, the various criteria may include a criterion for enabling the resonator 1100 to have the characteristic of the metamaterial, a criterion for enabling the resonator 1100 to have a negative magnetic permeability in a target frequency, a criterion enabling the resonator 1100 to have a zeroth order resonance characteristic in the target frequency, and the like. The capacitance of the capacitor 1120 may be determined based on at least one criterion.

The resonator 1100, also referred to as the MNG resonator 1100, may have a zeroth order resonance characteristic that has, as a resonance frequency, a frequency when a propagation constant is "0". Because the resonator 1100 may have the zeroth order resonance characteristic, the resonance frequency may be independent with respect to a physical size of the MNG resonator 1100. By appropriately designing the capacitor 1120, the MNG resonator 1100 may sufficiently change the resonance frequency. Accordingly, the physical size of the MNG resonator 1100 may not be changed.

Referring to the MNG resonator 1100 of FIG. 11, in a near field, the electric field may be concentrated on the capacitor 1120 inserted into the transmission line. Accordingly, due to the capacitor 1120, the magnetic field may become dominant in the near field. Because the MNG resonator 1100 having the zeroth-order resonance characteristic may have characteristics similar to a magnetic dipole, the magnetic field may become dominant in the near field. A relatively small amount of the electric field formed due to the insertion of the capacitor 1120 may be concentrated on the capacitor 1120 and thus, the magnetic field may become further dominant.

Also, the MNG resonator 1100 may include the matcher 1130 for impedance matching. The matcher 1130 may adjust the strength of magnetic field of the MNG resonator 1100. An impedance of the MNG resonator 1100 may be determined by the matcher 1130. For example, current may flow into and/or out of the MNG resonator 1100 via a connector 1140. The connector 1140 may be connected to the ground conducting portion 1113 or the matcher 1130.

For example, as shown in FIG. 11, the matcher 1130 may be positioned within the loop formed by the loop structure of the resonator 1100. The matcher 1130 may adjust the impedance of the resonator 1100 by changing the physical shape of the matcher 1130. For example, the matcher 1130 may include the conductor 1131 for the impedance matching in a location that is separated from the ground conducting portion 1113 by a distance h. Accordingly, the impedance of the resonator 1100 may be changed by adjusting the distance h.

Although not illustrated in FIG. 11, a controller may be provided to control the matcher 1130. In this example, the matcher 1130 may change the physical shape of the matcher 1130 based on a control signal generated by the controller. For example, the distance h between the conductor 1131 of the matcher 1130 and the ground conducting portion 1113 may increase or decrease based on the control signal. Accordingly, the physical shape of the matcher 1130 may be changed and the impedance of the resonator 1100 may be adjusted.

The distance h between the conductor 1131 of the matcher 1130 and the ground conducting portion 1131 may be adjusted using a variety of schemes. For example, a plurality of conductors may be included in the matcher 1130 and the distance h may be adjusted by adaptively activating one of the conductors. As another example, the distance h may be adjusted by adjusting the physical location of the conductor 1131 up and down. The distance h may be controlled based on the control signal of the controller. For example, the controller may generate the control signal using various factors. An example of the controller generating the control signal is further described later.

As shown in FIG. 11, the matcher 1130 may be configured as a passive element such as the conductor 1131. As another example, the matcher 1130 may be configured as an active element such as a diode, a transistor, and the like. When the active element is included in the matcher 1130, the active element may be driven based on the control signal generated by the controller, and the impedance of the resonator 1100 may be adjusted based on the control signal. For example, a diode that is an active element may be included in the matcher 1130. The impedance of the resonator 1100 may be adjusted depending on whether the diode is in an ON state or in an OFF state.

Although not illustrated in FIG. 11, a magnetic core may pass through the resonator 1100 configured as the MNG resonator. The magnetic core may increase a power transmission distance.

Figure 12:
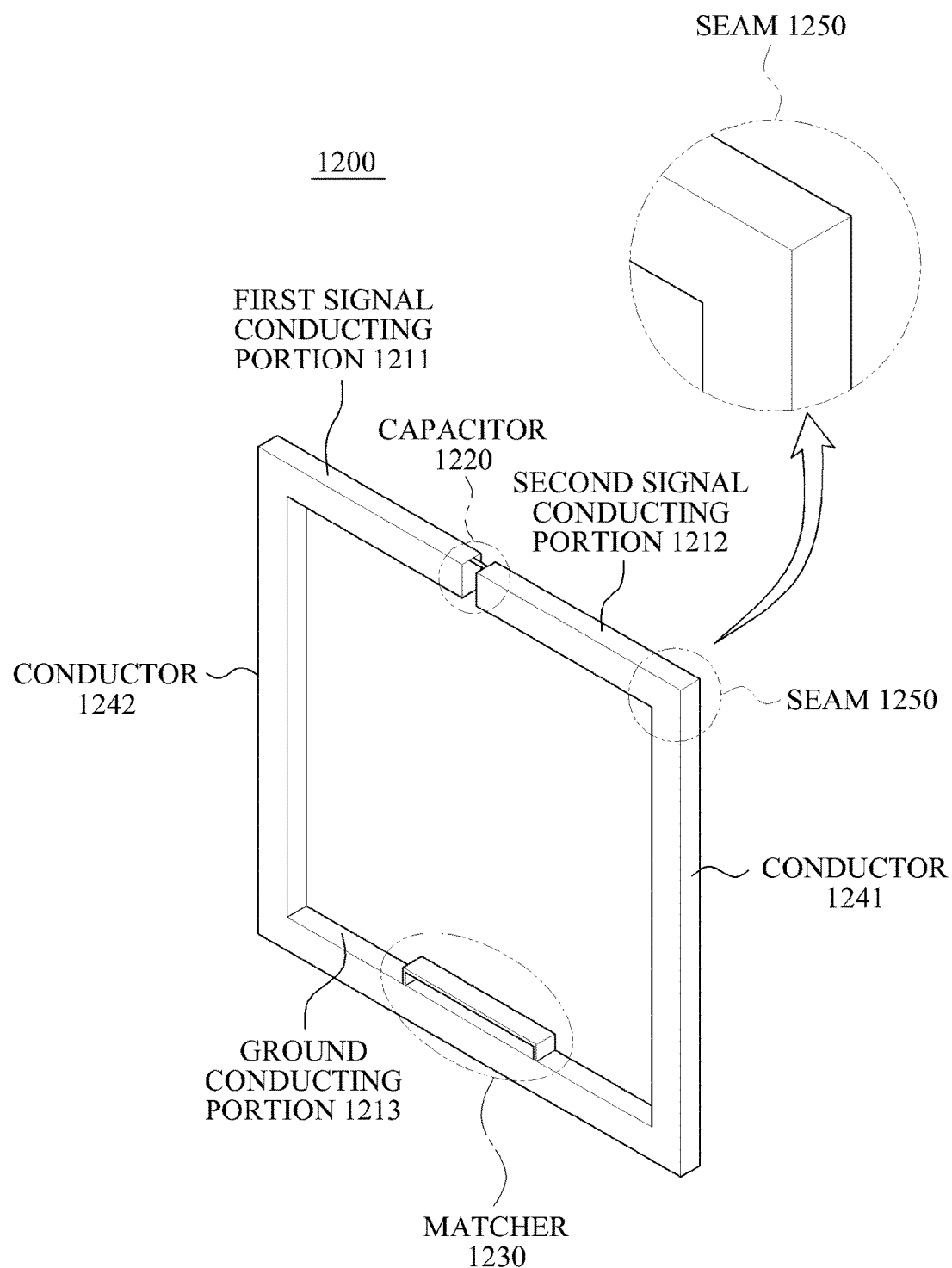

FIG. 12 illustrates an example of a bulky-type resonator for a wireless power transmission.

Referring to FIG. 12, a first signal conducting portion 1211 and a second signal conducting portion 1212 may be integrally formed instead of being separately manufactured and later connected to each other. Similarly, the second signal conducting portion 1212 and the conductor 1241 may also be integrally manufactured.

When the second signal conducting portion 1212 and the conductor 1241 are separately manufactured and connected to each other, a loss of conduction may occur due to a seam 1250. The second signal conducting portion 1212 and the conductor 1241 may be connected to each other without using a separate seam such that they are seamlessly connected to each other. Accordingly, it is possible to decrease a conductor loss caused by the seam 1250. Accordingly, the second signal conducting portion 1212 and the ground conducting portion 1231 may be seamlessly and integrally manufactured. Similarly, the first signal conducting portion 1211 and the ground conducting portion 1231 may be seamlessly and integrally manufactured.

Referring to FIG. 12, a type of a seamless connection connecting at least two partitions into an integrated form is referred to as a bulky-type.

Figure 13:
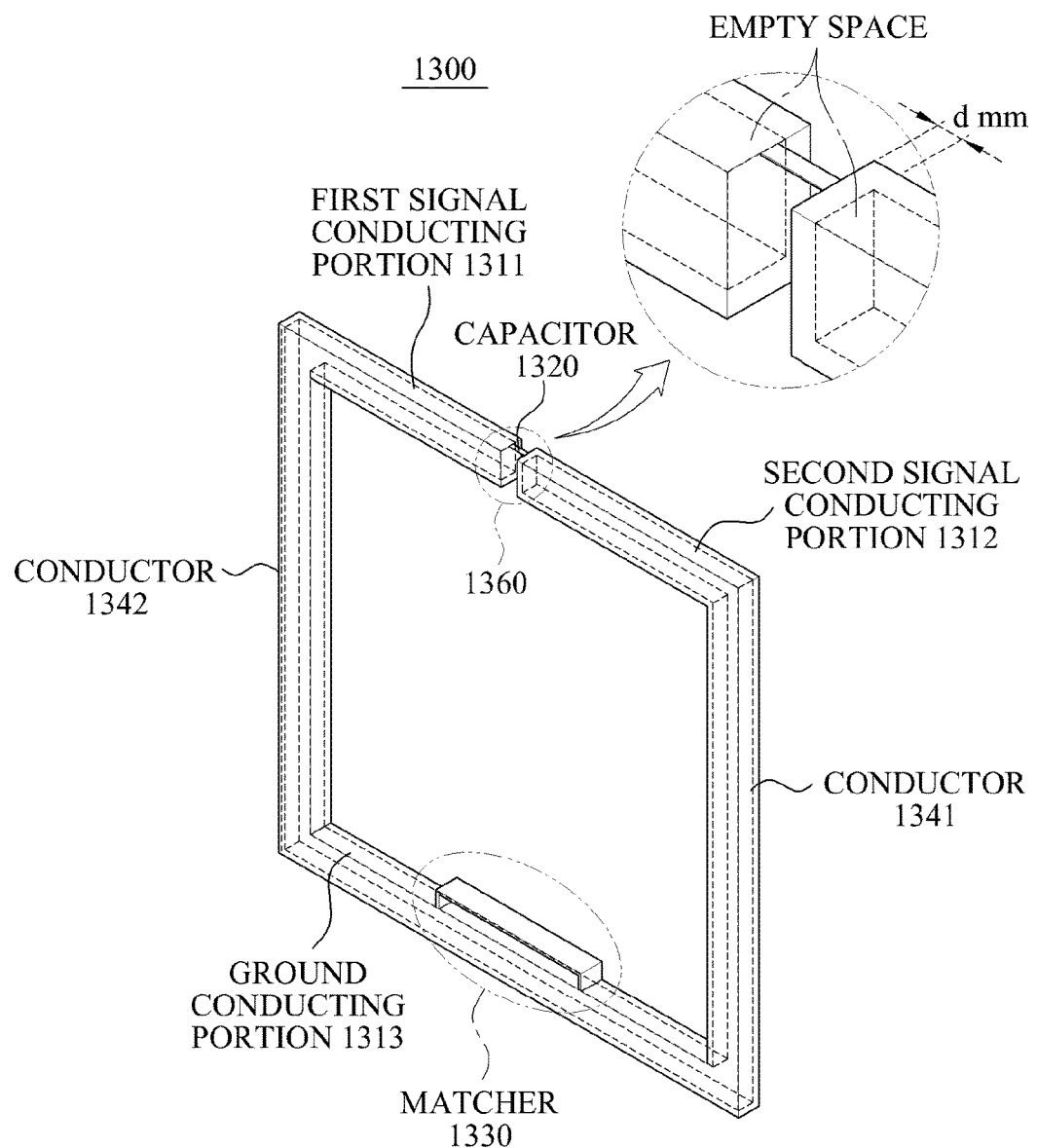

FIG. 13 illustrates an example of a hollow-type resonator for wireless power transmission.

Referring to FIG. 13, each of a first signal conducting portion 1311, a second signal conducting portion 1312, a ground conducting portion 1313, and conductors 1341 and 1342 of the resonator 1300 configured as the hollow-type include an empty space inside.

In a given resonance frequency, an active current may be modeled to flow in only a portion of the first signal conducting portion 1311 instead of the entire first signal conducting portion 1311, only a portion of the second signal conducting portion 1312 instead of the entire second signal conducting portion 1312, only a portion of the ground conducting portion 1313 instead of the entire ground conducting portion 1313, and only a portion of the conductors 1341 and 1342 instead of the entire conductors 1341 and 1342. For example, when a depth of each of the first signal conducting portion 1311, the second signal conducting portion 1312, the ground conducting portion 1313, and the conductors 1341 and 1342 is significantly deeper than a corresponding skin depth in the given resonance frequency, it may be ineffective. The significantly deeper depth may increase a weight or manufacturing costs of the resonator 1300.

Accordingly, in the given resonance frequency, the depth of each of the first signal conducting portion 1311, the second signal conducting portion 1312, the ground conducting portion 1313, and the conductors 1341 and 1342 may be appropriately determined based on the corresponding skin depth of each of the first signal conducting portion 1311, the second signal conducting portion 1312, the ground conducting portion 1313, and the conductors 1341 and 1342. When the first signal conducting portion 1311, the second signal conducting portion 1312, the ground conducting portion 1313, and the conductors 1341 and 1342 have an appropriate depth that is deeper than a corresponding skin depth, the resonator 1300 may become light, and manufacturing costs of the resonator 1300 may also decrease.

For example, as shown in FIG. 13, the depth of the second signal conducting portion 1312 may be determined as "d" mm and d may be determined according to $$d = \frac{1}{\sqrt{\pi f \mu \sigma}}.$$

In this example, f denotes a frequency, µ denotes a magnetic permeability, and σ denotes a conductor constant.

For example, when the first signal conducting portion 1311, the second signal conducting portion 1312, the ground conducting portion 1313, and the conductors 1341 and 1342 are made of a copper and have a conductivity of $5.8 \times 10^7$ siemens per meter (S·m−1), the skin depth may be about 0.6 mm with respect to 10 kHz of the resonance frequency and the skin depth may be about 0.006 mm with respect to 100 MHz of the resonance frequency.

Figure 14:
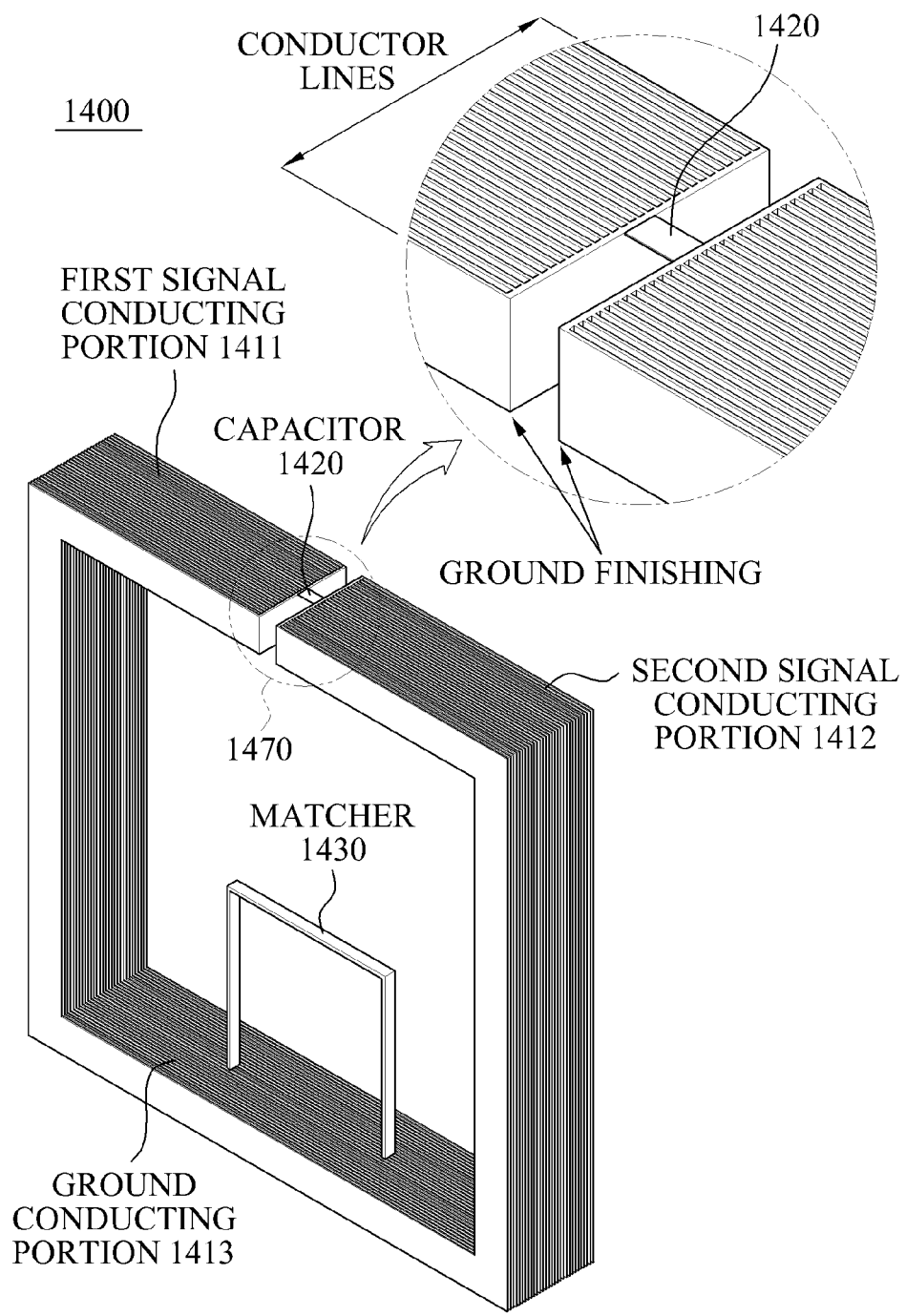

FIG. 14 illustrates an example of a resonator for wireless power transmission using a parallel-sheet.

Referring to FIG. 14, the parallel-sheet may be applicable to each of a first signal conducting portion 1411 and a second signal conducting portion 1412 included in the resonator 1400.

For example, the first signal conducting portion 1411 and the second signal conducting portion 1412 may not be a perfect conductor, and thus, may have a resistance. Due to the resistance, an ohmic loss may occur. The ohmic loss may decrease a Q-factor and may also decrease a coupling effect.

By applying the parallel-sheet to each of the first signal conducting portion 1411 and the second signal conducting portion 1412, it is possible to decrease the ohmic loss, and to increase the Q-factor and the coupling effect. For example, referring to a portion 1470 indicated by a circle, when the parallel-sheet is applied, each of the first signal conducting portion 1411 and the second signal conducting portion 1412 may include a plurality of conductor lines. For example, the plurality of conductor lines may be disposed in parallel, and may be shorted at an end portion of each of the first signal conducting portion 1411 and the second signal conducting portion 1412.

As described above, when the parallel-sheet is applied to each of the first signal conducting portion 1411 and the second signal conducting portion 1412, the plurality of conductor lines may be disposed in parallel. Accordingly, a sum of resistances having the conductor lines may decrease. As a result, the resistance loss may decrease, and the Q-factor and the coupling effect may increase.

Figure 15:
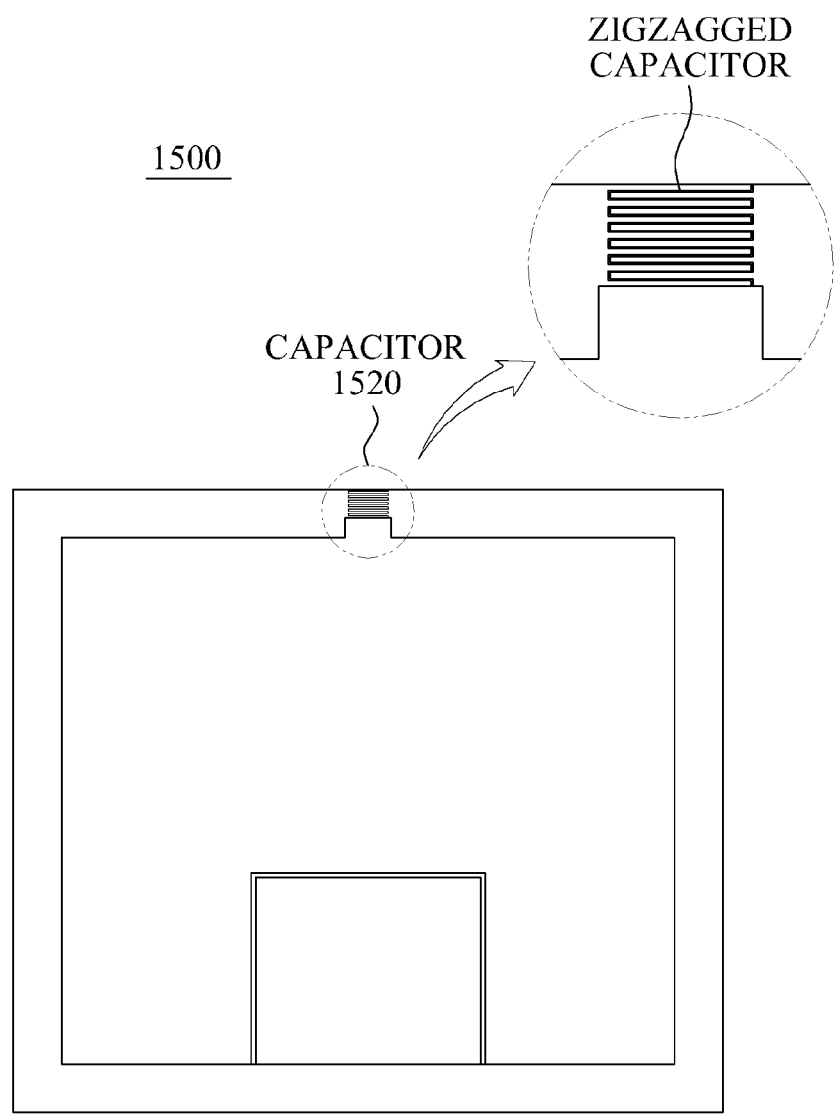

FIG. 15 illustrates an example of a resonator for wireless power transmission, including a distributed capacitor.

Referring to FIG. 15, a capacitor 1520 included in the resonator 1500 for the wireless power transmission may be a distributed capacitor. A capacitor as a lumped element may have a relatively high equivalent series resistance (ESR). A variety of schemes have been proposed to decrease the ESR contained in the capacitor of the lumped element. For example, by using the capacitor 1520 as a distributed element, it is possible to decrease the ESR. A loss caused by the ESR may decrease a Q-factor and a coupling effect.

As shown in FIG. 15, the capacitor 1520 as the distributed element may have a zigzagged structure. For example, the capacitor 1520 as the distributed element may be configured as a conductive line and a conductor having the zigzagged structure.

As shown in FIG. 15, by employing the capacitor 1520 as the distributed element, it is possible to decrease the loss that occurs due to the ESR. In addition, by disposing a plurality of capacitors as lumped elements, it is possible to decrease the loss that occurs due to the ESR. Because a resistance of each of the capacitors as the lumped elements decreases through a parallel connection, active resistances of parallel-connected capacitors as the lumped elements may also decrease and the loss that occurs due to the ESR may decrease. For example, by employing ten capacitors of 1 pF instead of using a single capacitor of 10 pF, it is possible to decrease the loss occurring due to the ESR.

Figure 16A:
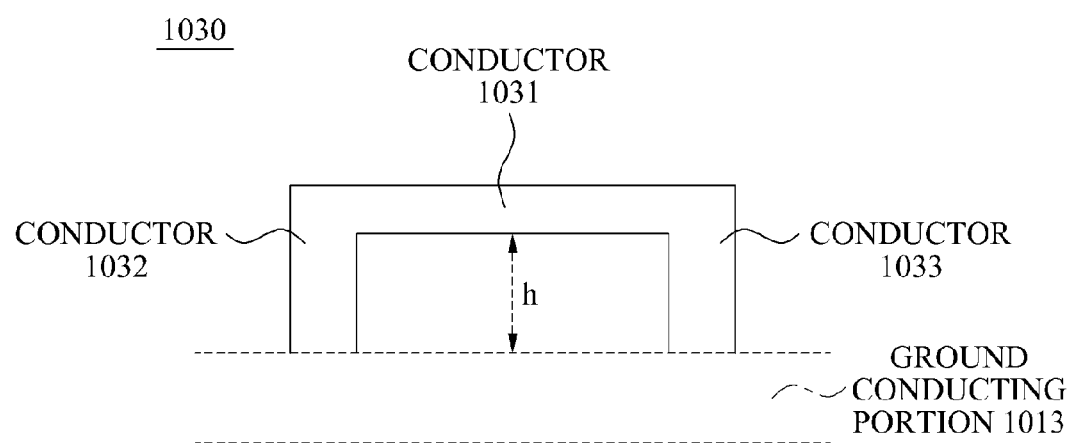
Figure 16B:
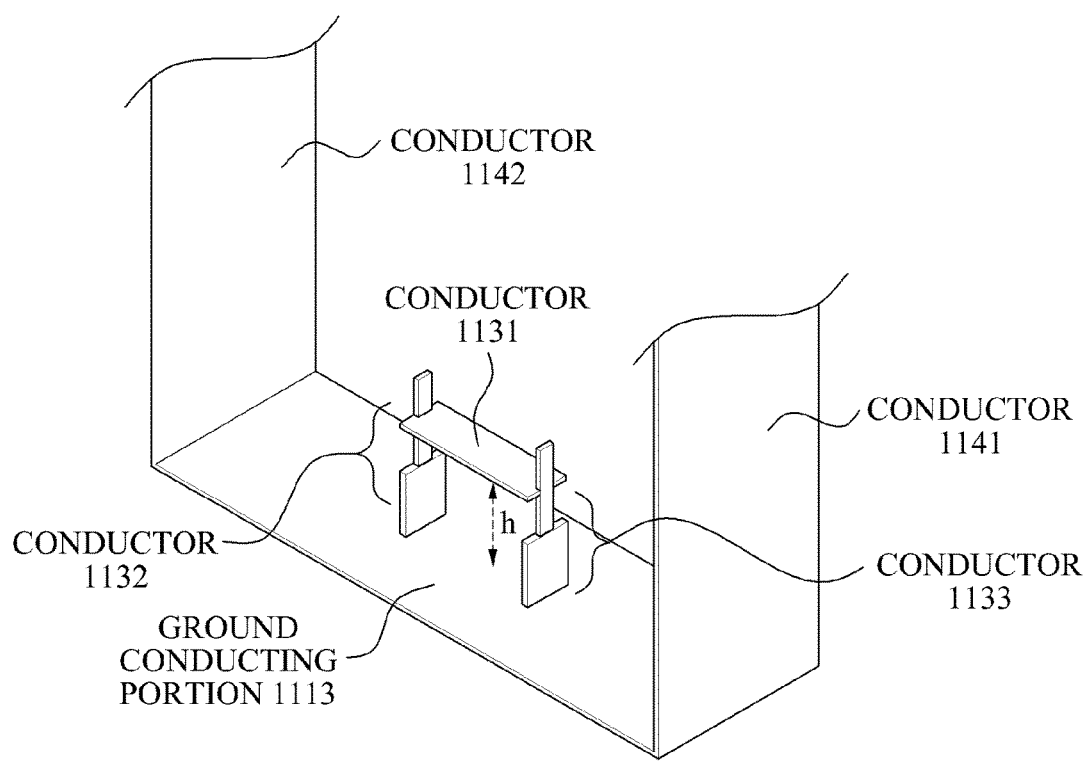

FIG. 16A illustrates an example of the matcher 1030 used in the resonator 1000 of FIG. 10, and FIG. 16B illustrates an example of the matcher 1130 used in the resonator 1100 of FIG. 11.

FIG. 16A illustrates a portion of the 2D resonator example including the matcher 1030, and FIG. 13B illustrates a portion of the 3D resonator example including the matcher 1130.

Referring to FIG. 16A, the matcher 1030 includes a conductor 1031, a conductor 1032, and a conductor 1033. The conductors 1032 and 1033 may be connected to the ground conducting portion 1013 and the conductor 1031. The impedance of the 2D resonator may be determined based on a distance h between the conductor 1031 and the ground conducting portion 1013. For example, the distance h between the conductor 1031 and the ground conducting portion 1013 may be controlled by the controller. The distance h between the conductor 1031 and the ground conducting portion 1013 may be adjusted using a variety of schemes. For example, the variety of schemes may include a scheme of adjusting the distance h by adaptively activating one of the conductors 1031, 1032, and 1033, a scheme of adjusting the physical location of the conductor 1031 up and down, and the like.

Referring to FIG. 16B, the matcher 1130 includes a conductor 1131, a conductor 1132, and a conductor 1133. The conductors 1132 and 1133 may be connected to the ground conducting portion 1113 and the conductor 1131. The conductors 1132 and 1133 may be connected to the ground conducting portion 1113 and the conductor 1131. The impedance of the 3D resonator may be determined based on a distance h between the conductor 1131 and the ground conducting portion 1113. For example, the distance h between the conductor 1131 and the ground conducting portion 1113 may be controlled by the controller. Similar to the matcher 1030 included in the 2D resonator example, in the matcher 1130 included in the 3D resonator example, the distance h between the conductor 1131 and the ground conducting portion 1113 may be adjusted using a variety of schemes. For example, the variety of schemes may include a scheme of adjusting the distance h by adaptively activating one of the conductors 1131, 1132, and 1133, a scheme of adjusting the physical location of the conductor 1131 up and down, and the like.

Although not illustrated in FIGS. 16A and 16B, the matcher may include an active element. A scheme of adjusting an impedance of a resonator using the active element may be similar as described above. For example, the impedance of the resonator may be adjusted by changing a path of current flowing through the matcher using the active element.

Figure 17:
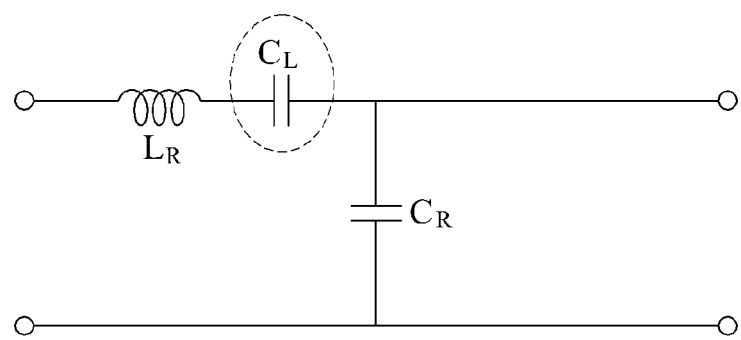
FIG. 17 is a diagram illustrating an example of an equivalent circuit of the resonator for a wireless power transmission of FIG. 10.

FIG. 17 illustrates an example of an equivalent circuit of the resonator 1000 for wireless power transmission of FIG. 10.

The resonator 1000 for the wireless power transmission may be modeled to the equivalent circuit of FIG. 17. In the equivalent circuit of FIG. 17, CL denotes a capacitor that is inserted in a form of a lumped element in the middle of the transmission line of FIG. 10.

In this example, the resonator 1000 may have a zeroth resonance characteristic. For example, when a propagation constant is "0", the resonator 1000 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \qquad \text{[Equation 2]}$$

In Equation 2, MZR denotes a Mu zero resonator.

Referring to Equation 2, the resonance frequency $\omega_{MZR}$ of the resonator 1000 may be determined by $L_R/C_L$. A physical size of the resonator 1000 and the resonance frequency $\omega_{MZR}$ may be independent with respect to each other. Because the physical sizes are independent with respect to each other, the physical size of the resonator 1000 may be sufficiently reduced.

In one general aspect, there is provided a wireless power transmission apparatus including a source resonator to transmit resonance power to a target resonator side, a coupling unit to couple a reflected signal with respect to the transmitted resonance power, a resonance point detecting unit to scan a frequency of the reflected signal to detect a resonance point, and an impedance control unit to adjust an impedance of the source resonator based on the detected resonance point.

In another general aspect, there is provided a wireless power transmission method that performs frequency scanning with respect to a reflected signal of a transmitted resonance to power, detecting a resonance point using a performance result of the frequency scanning, and adjusts an impedance of a source resonator based on the detected resonance point.

In certain aspects, a resonance point for a wireless power transmission may be monitored.

Accordingly, an effective tuning of the resonance point may be possible in a case in which a mismatch occurs between a source resonator and a target resonator. Also, a power loss due to a reflected wave between the source resonator and the target resonator may decrease.

In a case in which a coupling frequency varies due to an impedance mismatch between the source resonator and the target resonator, an impedance matching may be performed by detecting the resonance point.

The processes, functions, methods, and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmission apparatus comprising:
   a source resonator to transmit resonance power to a target resonator;
   a coupling unit to couple a reflected signal with respect to the transmitted resonance power;
   a resonance point detecting unit to scan a frequency band of the reflected signal, verify an amplitude of the reflected signal corresponding to the frequency band, and determine a coupling frequency based on the amplitude, wherein the source resonator and the target resonator are coupled at the coupling frequency;
   a control unit configured to calculate a frequency deviation between a resonance frequency of the source resonator and the coupling frequency, and calculate an impedance deviation corresponding to the frequency deviation; and
   an impedance control unit to adjust the impedance of the source resonator based on the impedance deviation,
   wherein the impedance of the source resonator is adjusted by changing a distance between a conducting portion of the source resonator and a conductor of a matcher being electrically connected with the source resonator.

2. The apparatus of claim 1, wherein the resonance point detecting unit comprises:
   a level adjusting unit to adjust a signal level of the reflected signal;
   a power level detecting unit to detect a power level of the adjusted reflected signal; and
   a frequency scanning unit to perform frequency scanning with respect to the detected power level.

3. The apparatus of claim 2, wherein the resonance point detecting unit further comprises:
   a frequency synthesizer to output a frequency signal indicating a shifted level of a frequency of an alternating current (AC) signal that shifted due to an effect of the reflected signal, wherein the AC signal is converted by an AC converter.

4. The apparatus of claim 1, wherein the impedance control unit sets an impedance set value for a maximal power transmission to be 33 ohms to 55 ohms.

5. The apparatus of claim 1, wherein the impedance control unit adjusts the impedance of the source resonator to achieve a wireless power transmission efficiency that is above a threshold value.

6. A wireless power transmission method comprising:
   performing frequency scanning with respect to a reflected signal of a transmitted resonance power;
   determining a coupling frequency based on an amplitude of the reflected signal, wherein a source resonator and a target resonator are coupled at the coupling frequency;
   calculating a frequency deviation between a resonance frequency and the coupling frequency;
   calculating an impedance deviation corresponding to the frequency deviation; and
   adjusting the impedance of the source resonator based on the impedance deviation,
   wherein the impedance of the source resonator is adjusted by changing a distance between a conducting portion of the source resonator and a conductor of a matcher being electrically connected with the source resonator.

7. The method of claim 6, wherein the detecting comprises:
adjusting a signal level of the reflected signal;
converting the adjusted reflected signal level into a direct current (DC) signal; and
performing frequency scanning with respect to the reflected signal having the adjusted signal level.

8. The method of claim 6, wherein the detecting comprises:
synthesizing a frequency of an alternating current (AC) signal converted by an AC converter and a frequency of the reflected signal to output a frequency signal indicating a shifted level of the frequency of the AC signal that shifted due to an effect of the reflected signal; and
converting the frequency signal into a DC signal.

9. The method of claim 6, wherein the adjusting comprises:
adjusting the impedance of the source resonator to be 33 ohms to 55 ohms based on the impedance deviation.

10. The method of claim 6, wherein the impedance is adjusted to achieve a wireless power transmission efficiency that is above a threshold value.

11. A wireless power receiving device comprising:
a target resonator configured to receive power wirelessly from a source resonator; and
a load configured to consume the wireless power received from the source resonator,
wherein the wireless power receiving device reflects a portion of the wireless power received from the source resonator, and the target resonator is further configured to receive wireless power from the source resonator that has a change in impedance based on an impedance set value for a maximal power transmission and an impedance deviation corresponding to a frequency deviation between a resonance frequency and coupling frequency, wherein a source resonator and a target resonator are coupled at the coupling frequency,
wherein the coupling frequency is determined based on an amplitude of the reflected signal corresponding to a frequency band of the reflected signal,
wherein the impedance of the source resonator is adjusted by changing a distance between a conducting portion of the source resonator and a conductor of a matcher being electrically connected with the source resonator.

12. The wireless power receiving device of claim 11, further comprising a rectifier to rectify a power signal received from the source resonator.

* * * * *